US012469588B2

(12) United States Patent
Tamborra (10) Patent No.: US 12,469,588 B2
(45) Date of Patent: Nov. 11, 2025

(54) DISTRIBUTIONS COMPARISON IN PRETREATMENT PATIENT-QA

(71) Applicants: ISTITUTO TUMORI "GIOVANNI PAOLO II" I.R.C.C.S., Bari (IT); Pasquale Tamborra, Terlizzi (IT)

(72) Inventor: Pasquale Tamborra, Terlizzi (IT)

(73) Assignees: ISTITUTO TUMORI "GIOVANNI PAOLO II" I.R.C.C.S., Bari (IT); Pasquale Tamborra, Terlizzi (IT)

( * ) Notice: Subject to any disclaimer, the term of this patent is extended or adjusted under 35 U.S.C. 154(b) by 802 days.

(21) Appl. No.: 17/440,676

(22) PCT Filed: Sep. 24, 2019

(86) PCT No.: PCT/IT2019/000076
§ 371 (c)(1),
(2) Date: Sep. 17, 2021

(87) PCT Pub. No.: WO2021/105930
PCT Pub. Date: Apr. 1, 2021

(65) Prior Publication Data
US 2022/0068459 A1 Mar. 3, 2022

(51) Int. Cl.
*G16H 20/40* (2018.01)
*A61N 5/10* (2006.01)
*G16H 40/60* (2018.01)

(52) U.S. Cl.
CPC ........... *G16H 20/40* (2018.01); *A61N 5/1031* (2013.01); *A61N 5/1071* (2013.01); *G16H 40/60* (2018.01)

(58) Field of Classification Search
CPC .... A61N 5/1071; A61N 5/1031; A61N 5/103; A61N 2005/1087; A61N 5/1081;
(Continued)

(56) References Cited

U.S. PATENT DOCUMENTS 7,298,819 B2 * 11/2007 Dooley ............... A61N 5/1031
600/407
7,801,349 B2 * 9/2010 Wang .................. A61N 5/1031
378/65
(Continued)

FOREIGN PATENT DOCUMENTS

EP 3 264 298 1/2018

OTHER PUBLICATIONS

Mark Chan, et al., "Optimizing the prescription isodose level in stereotactic volumetric-modulated arc radiotherapy of lung lesions as a potential for dose de-escalation", Radiation Oncology, vol. 13, No. 1, Feb. 9, 2018, 11 pages.
(Continued)

*Primary Examiner* — Irakli Kiknadze
(74) *Attorney, Agent, or Firm* — NIXON & VANDERHYE (57) ABSTRACT

Disclosed is a method validate in a patient treatment plan of radiotherapy, the calculated radiation dose by treatment planning system (TPS) software, before its delivery on patient, in order to avoid clinically relevant dose differences in organs at risks, wherein the operator selected isodose levels (i.e. the set of points or zones in a medium that receive the same dose of radiation) are converted into volumetric 3D structures that are properly used to value either the operator selected CRDVCs (Clinical Relevant Dose Volumetric Conditions) and their relative spatial correspondence thus detecting all the dose differences in organs at risk. (OARs) and in PTV (Planning Target Volume) that can be responsible for the inadequacy or the clinical unacceptability (i.e. undeliverability) of the radiotherapic treatment plan.

20 Claims, 4 Drawing Sheets

(58) Field of Classification Search
CPC .. A61N 5/1043; A61N 5/1065; A61N 5/1001;
A61N 5/1084; A61N 2005/1041; A61N
5/1049; A61N 5/1007; A61N 5/1039;
A61N 2005/1012; A61N 2005/1032;
A61N 2005/1074; G16H 40/60; G16H
20/40; G16H 30/20; G06N 20/00; G06F
19/321; G06F 19/3481; A61B 2017/3411
USPC ........................................................ 378/65
See application file for complete search history.

(56) References Cited

U.S. PATENT DOCUMENTS

2010/0104068 A1* 4/2010 Kilby ................... A61N 5/1031
378/65
2019/0255355 A1 8/2019 Nordstrom et al.

OTHER PUBLICATIONS

International Search Report and Written Opinion of the ISA for PCT/IT2019/000076 dated May 28, 2020, 14 pages.

* cited by examiner

DISTRIBUTIONS COMPARISON IN PRETREATMENT PATIENT-QA

This application is the U.S. national phase of International Application No. PCT/IT2019/000076 filed Sep. 24, 2019 which designated the U.S., the entire contents of which are hereby incorporated by reference.

BACKGROUND OF THE INVENTION

Field of the Invention

The present invention relates the field of the radiotherapic techniques and a method, implemented by software, which is alternative to gamma analysis, to validate in a patient treatment plan of radiotherapy the calculated dose distribution by TPS treatment planning system) software, before its delivery on patient.

The validation is necessary to avoid clinically relevant dose differences: in organs at risk (OARs) responsible for potential injuries. According to the invention, this method is based on the proper use of isodose levels (i.e. the set of points or zones in a medium that receive equal doses of radiation) as volumetric 3D structures to value the dose conditions mentioned and their relative spatial correspondence. This method analyzes the dose distributions of the TPS and the measured plans and can detect all the dose differences whose clinical impact is relevant.

Description of the Related Art

The aim of radiotherapy is to maximize the tumor dose (i.e. the dose to the PTV (Planning Target Volume)) keeping low the neighboring healthy tissues doses (i.e. the dose to the OARs (Organs At Risk)). Complex radiotherapic treatment plans need a patient specific Quality Assurance (QA). The QA can reveal an inaccurate calculation of the radiation dose distribution for the treatment planning system (TPS) or the failure of the record-and-verify as well as the delivery system of the linear accelerator.

Nowadays it is possible to estimate the patient dose by QA measurements on the same CT images and structures used in TPS plan. Successively, the patient measured dose distribution (i.e. the patient dose distribution obtained by QA measurements) can be compared to the TPS dose distribution (i.e. the patient dose distribution calculated by TPS software). Currently the comparison is achieved using gamma analysis. Unfortunately, several studies showed the lack of correlation between gamma analysis (gamma passing rate) and clinically relevant dose differences in organs at risk (OARs).

In radiotherapy precise tolerance values cannot be universally established when deciding the clinical acceptability of a treatment plan. Nevertheless, it is always possible to select some "per patient" clinically relevant dose-volumetric conditions (based on the choices of the individual operator) encountered in the TPS plan that have to be respected also in the measured plan in order to consider it as clinically deliverable. Therefore a new flexible and efficient method would be necessary to test either the spatial dose correspondence between measured and TPS plans and all operator-selected conditions for clinical acceptability.

The aim of the present invention is to disclose a novel methodology based on the proper use of isodose levels as volumetric 3D structures to value the dose conditions mentioned and their relative spatial correspondence. This method analyzes the dose distributions of the TPS and the measured plans and can detect all the dose differences whose clinical impact is relevant.

Through the years, new radiotherapic techniques have been implemented to yield complex, highly target-conformed dose distributions with sharp gradients. IMRT, VMAT[1-3] and TomoTherapy are just some of these complex, well known techniques which are today routinely adopted. Each patient treatment plan drawn up using these techniques needs a patient-specific quality assurance (QA). The QA can reveal an inaccurate calculation of the dose distribution for the treatment planning system (TPS) or the failure of the record-and-verify system as well as the delivery system of the linear accelerator[4-5]. Generally, QA protocols use the comparison of the measured dose distribution (usually delivered to a phantom) with the TPS generated dose distribution. Currently the comparison is achieved by using gamma analysis (Low et al.[6]). The gamma passing rate (i.e. the percentage of voxels having a gamma index lower than 1) of gamma analysis, is the parameter universally adopted for acceptance of dose distribution comparison.

Currently, several software programmes such as Compass (IBA-Wellhofer), Dosimetry Check (Math Resolutions LLC), 3DVH (Sun Nuclear Corporation) and Delta4 (ScandiDos) have been developed to estimate patient dose based on QA measurements. These software programmes are regularly used to show the estimated dose on the same CT images and structures used in TPS plan. As a consequence, they can calculate patient DVH (Dose Volume Histogram) based on QA measurement. In any case, the analysis adopted for dose distribution comparison remains the gamma analysis.

Several studies by Nelms et al.[7], Zhen et al.[8] and Stasi et al.[9] showed the lack of correlation between gamma analysis (gamma passing rate) and dose differences in organs at risk (OARs). All these studies shared the same conclusion regarding doubts of the reliability of the gamma analysis for patient-specific QA (Coleman et al.[10]), thus recently inducing the American Association of Physicists in Medicine (AAPM) to publish the TG (Task Group) 218 report[11]. This report provided recommendations and tolerance limits in patient-specific QA as well as the causes for accuracy reduction of gamma analysis. Some recommendations of TG 218:
- to perform QA measurements using the True Composite delivery method
- to perform in absolute dose mode the analysis of QA measurements and corresponding treatment plan
- to use global normalization
- to use a dose threshold of 10%
- to adopt for universal tolerance limits: gamma passing rate≥95%, with 3%/2 mm and a 10% dose threshold
- to use tighter criteria (such as 2%/1 mm or 1%/1 mm) to detect local errors
- to review the gamma statistics on a structure by structure basis
- to prefer software tools able to measure the agreement between measured and calculated DVHs of patient structures rather than analysis in phantoms.

A treatment plan can be considered as deliverable if the PTV coverage and organs at risk sparing are the same as expected by the TPS plan. With this aim, the difference between the planned DVH and the QA estimated DVH for pass/fail evaluation could be adopted[12-14]. However, although the need for a methodology allowing the evaluation of errors on patient plan DVH is commonly acknowledged, the complexity and the variability of treatment plans makes it difficult to develop such a methodology. In fact, a direct consequence of DVH plan analysis is that acceptable tolerances would be defined as a function of expected dose in TPS plan and associated dose limits for each OAR. For instance, considering that the optic nerve dose limit is 55 Gy, if the expected dose in the TPS plan for an optic nerve is 52 Gy, the acceptable tolerance should be more limited than if the expected dose in the TPS plan was only 25 Gy.

Furthermore, an exclusive DVH method for patient plan QA cannot be completely reliable from a clinical point of view. In fact, the DVH representation, like the gamma passing rate of the gamma analysis, gives no information about spatial dose distribution; however, the location and clustering of the failing points are essential factors for a correct clinical evaluation of the radiotherapic plan (see AAPM report TG 218)[11].

If considered from a broader perspective, radiotherapic clinical acceptability is rarely simple and immediate. More often clinical acceptability depends on several factors such as the treatment technique adopted (IMRT, stereotactic, etc.), patient clinical conditions, treatment purpose and, finally, the individual operator's choice. Moreover, clinical acceptable doses to OARs themselves cannot be considered standard because they are reduced dramatically either in the case of re-irradiation or in the presence of previous injuries to the organ.

All these reasons explain that precise tolerance values cannot be universally established when deciding the clinical acceptability of a treatment plan.

Mark Chan et al disclose in "Optimizing the prescription isodose level in stereotactic volumetric modulated arc radiotherapy of lung lesions as a potential for dose de-escalation", RADIATION ONCOLOGY, vol. 13, no. 1, 9 Feb. 2018 (2018-02-09) "the feasibility of enhancing the dosimetric quality of inverse VMAT optimization by assessing the optimal PIL and with the potential for dose de-escalation". In other words the authors want to increase the dosimetric quality of a VMAT plan by assessing the optimal PIL (Prescription Isodose Level). The evaluation of the dosimetric quality of a radiotherapic treatment plan (VMAT plan is just a kind of radiotherapic treatment plan) is carried out by the evaluation of some specific dosimetric parameters such as dose to 1% of the cord, trachea, esophagus etc (see page 3 of 11 third paragraph). As a consequence, the comparison among plans is performed through the comparison of the dosimetric parameters. However the dosimetric comparison is useful for the choice of the best treatment plan before it is delivery on patient but the comparison of dosimetric parameters is not sufficient for the validation of the chosen treatment plan.

All methods that can be adopted for the treatment plan validation before its delivery to patient lack information about the exact position of the dosimetric parameters adopted for plan evaluation.

Nevertheless, the TPS plan must always encounter some "per patient" clinically relevant dose-volumetric conditions (based on the choices of the individual operator) in order to be considered as clinically deliverable. The present inventor exploited the same clinically relevant dose-volumetric conditions chosen for TPS plan acceptance, in order to evaluate the deliverability of the measured plan. If the clinically relevant dose-volumetric conditions encountered in the TPS plan are respected also in the measured plan, then this is considered as clinically deliverable.

SUMMARY OF THE INVENTION

Therefore, a new flexible and efficient method can be adopted to test either the spatial dose correspondence between measured and TPS plans and all operator-selected conditions for clinical acceptability. Thus, according to the present invention, a novel method has been developed, based on the proper use of isodose levels as volumetric 3D structures to value the dose conditions mentioned and their relative spatial correspondence. This method analyzes the dose distributions of the TPS and the measured plans and can detect all the dose differences whose clinical impact is relevant.

In other words, this method is a tool to evaluate the differences between the measured plan and the calculated plan and allows to decide if the measured plan is clinically acceptable.

At the end of the optimization process, a TPS plan can be considered as clinically acceptable if these two kinds of condition are contemporarily satisfied:
 a) Adequate PTV coverage: X (in %) fraction of the PTV volume receives at least Y (in %) fraction of the dose prescription;
 b) OAR sparing: X (in % or in cm$^3$) fraction of the OAR volume receives no more than Y (in Gy) dose.

The X and Y values cannot be universally stated for all PTVs and OARs, nevertheless the operator can select for each patient some X and Y values (i.e. clinically relevant dose-volumetric conditions, from now on referred as CRDVC) satisfied in the TPS plan. These conditions, according to which the TPS plan was considered as clinically acceptable, must be verified in the measured plan.

In particular, a measured plan can be considered as clinically acceptable when these two kinds of condition are contemporarily encountered:
 1) the chosen CRDVC for all PTV and OARs are valid also in the measured plan;
 2) existence of spatial correspondence between the X volume (receiving Y dose) of a specific OAR or PTV in the TPS plan and the analogous volume in the measured plan.

According to the present invention it is disclosed a new method for dose comparison between TPS and measured plans, that is based on isodose levels used as volumetric structures (hereafter referred as Isodose-Structures method). The isodose structures (i.e. the isodose levels converted in volumetric structures) and the clinical structures are conveniently processed with the purpose of verifying each CRDVC. For this aim, only the isodose level related to a CRDVC is converted into a 3D structure (isodose structure). The conversion of the same isodose levels is made in both TPS and measured plans. The Isodose Structure method adopts the indexes Volume Ratio (VR) and Overlapping Ratio (OR) to evaluate conditions 1) and 2). Both indexes (OR and VR) must contemporarily exceed the relative threshold values to consider the measured plan as clinically acceptable.

Other details and characteristics of the present invention shall be shown throughout the description below referring to drawings attached to this report which are shown for illustrative but not limiting purposes only for a preferred embodiment of the invention.

DESCRIPTION OF THE PREFERRED EMBODIMENTS

In order to understand the IS method, an accurate description of its application in all its stages for head and neck cases will be given below, with reference to a preferred implementing rules of the invention:

a) All PTVs and OARs contours are firstly converted to high resolution segments. This step is necessary to accurately carry out Boolean operations or geometric expansions in particular on small structures;

b) Choice of CRDVCs (Clinical Relevant Dose Volumetric Condition). This step is necessary to select the isodose level related to each CRDVC. It is worthwhile to observe that the isodose levels selected for an OAR can be always considered as a superior limit that should not be exceeded in the measured plan. Otherwise, for the PTV it is possible to select two isodose levels: a minimum dose (=lower dose limit) that should be delivered to the whole (or to a large part of the) PTV to ensure the effectiveness of the radiotherapic treatment and a maximum dose (=upper dose limit) that should not be exceeded in the measured plan in order to avoid an harmful over-irradiation.

c) Conversion of selected isodose levels to structures in TPS plan. The following structures are generated: *TPS $D_{PTVmin}$, *TPS $D_{PTVmax}$ and *TPS $D_{OARi}$ (i stands for each OAR);

d) Conversion of selected isodose levels to structures in measured plan. The following structures are generated: *MSR $D_{PTVmin}$, *MSR $D_{PTVmax}$ and *MSR $D_{OARi}$ (i stands for each OAR);

e) Verifying that all structures obtained by the conversion of isodose levels are of high resolution type;

f) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi). (i stands for each OAR);

g) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi). (i stands for each OAR);

h) Choice the amount of the expansion (alpha in mm) (in order to consider several uncertainties in the measured plan)

i) Development of the following expanded structures in the TPS plan: EXP-TPS $D_{OARi}$ (obtained through an alpha (in mm) isotropic expansion of TPS $D_{OARi}$) and EXP-TPS $D_{PTVmax}$ (obtained through an alpha (in mm) isotropic expansion of TPS $D_{PTVmax}$);

j) Development of the following expanded structure in measured plan: EXP-MSR $D_{PTVmin}$ (obtained through an alpha (in mm) isotropic expansion of MSR $D_{PTVmin}$);

k) Calculation of OR (Overlapping Ratio) factors and VR (Volume Ratio) factors defined as:

$$OR_{OARi} = \frac{MSRD_{OARi} \cap EXP - TPSD_{OARi}}{MSRD_{OARi}} \text{ and} \quad (1)$$

$$VR_{OARi} = \frac{TPSD_{OARi}}{MSRD_{OARi}} \quad (2)$$

for each OAR and for the $D_{PTVmax}$ isodose level (i.e. the upper dose limit for PTV). If MSR $D_i$ in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1);

l) Calculation of OR (Overlapping Ratio) factors and VR (Volume Ratio) factor-defined as:

$$OR_{PTVmin} = \frac{TPSD_{PTVmin} \cap EXP - MSRD_{PTVmin}}{TPSD_{PTVmin}} \text{ and} \quad (3)$$

$$VR_{PTVmin} = \frac{MSRD_{PTVmin}}{TPSD_{PTVmin}} \quad (4)$$

only for the $D_{PTVmin}$ isodose level (i.e. the lower dose limit for PTV).

Figure 1:
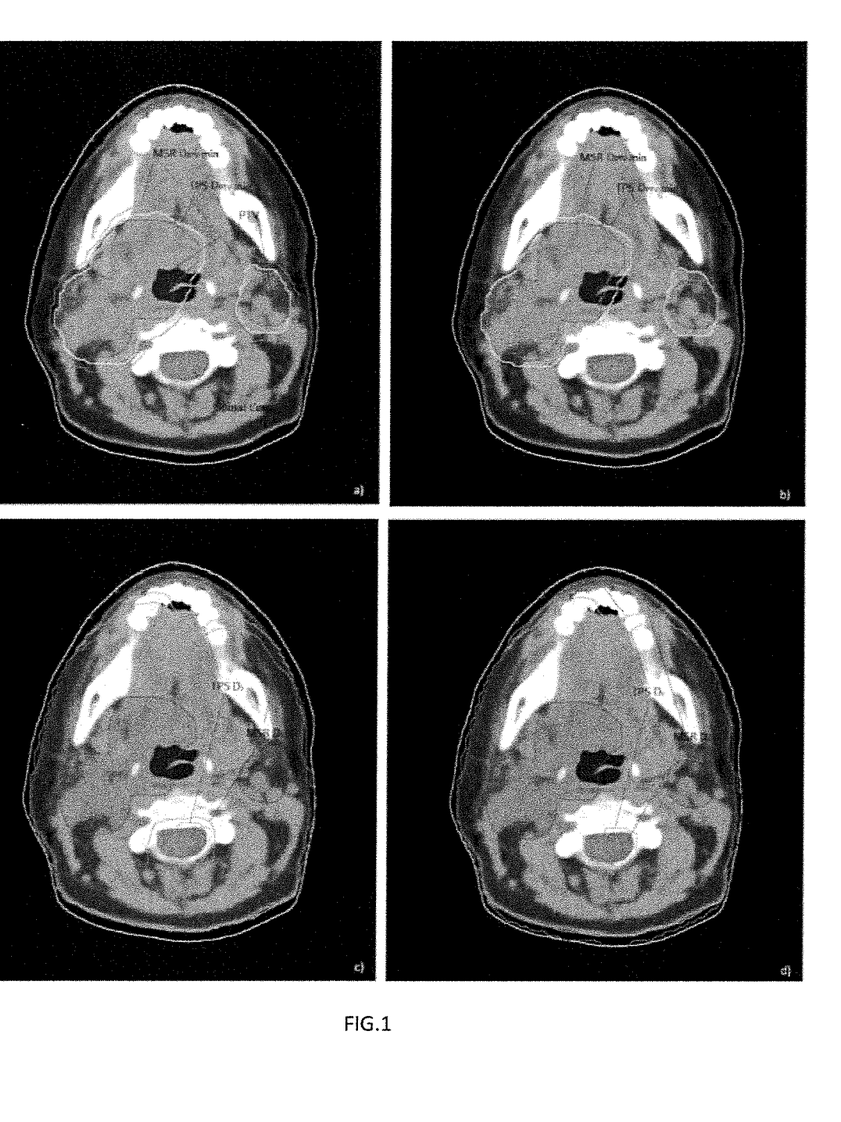
FIGS. 1a, 1b, 1c and 1d shows respectively four different conditions for clinical acceptability of a treatment plan. Adequate PTV coverage is granted in a) (TPS $D_{PTVmin}$ contained in MSR $D_{PTVmin}$) and not in b) (MSR $D_{PTVmin}$ contained in TPS $D_{PTVmin}$). Adequate OAR sparing is granted in c) (MSR $D_{SpinalCord}$ contained in TPS $D_{SpinalCord}$) and not in d) (TPS $D_{SpinalCord}$ contained in MSR $D_{SpinalCord}$).

It would be convenient at this point to disclose the previous stages:

To consider an OAR safe at least as expected by the TPS plan, the corresponding measured isodose structure (MSR $D_i$) has to be enclosed in the TPS isodose structure (see FIG. 1). Conversely, to consider a PTV covered at least as expected by the TPS plan, the TPS isodose structure (TPS $D_{PTVmin}$) should be enclosed in the measured isodose structure (MSR $D_{PTVmin}$). The OR parameter evaluates these conditions.

In this embodiment, the phantom positioning error could be avoided: unfortunately this inaccuracy is unavoidable for real QA (Quality Assurance) measurements. Nevertheless, the IS method has to account for the spatial uncertainty due to the grid dose resolution adopted for the reconstruction of the isodose levels as well as for the Boolean operations performed on the isodose structures. As a consequence, an alpha (in this example 2 mm) isotropic expansion needs to be adopted. This was carried out in stages i) and j);

The need for the expanded structure constitutes a critical issue particularly for the OR parameter calculation of small isodose structures. In fact, the alpha (in mm) isotropic expansion of a small structure may prove to be a final structure several times larger than the original structure. For this reason, the discriminating VR parameter is determinant.

Therefore the threshold values adopted in this preferred embodiment of the invention, for OR and VR factors, opportunely defined depending on structure volume dimension, are those reported in Table I.

It should be pointed out that the OR and VR threshold values depend on the degree of accuracy to be achieved in the comparison between measured and calculated isodose structure for each clinically relevant dose level (CRDVC). It is obvious that the standard of accuracy is not the same in all radiotherapy centers, as it is not the same (or necessarily high) for all types of treatment. The values suggested in table 1 are, according to the inventor, "reasonable", that is to say, they can be widely shared by a wide range of radiotherapy centers and for irradiated head-neck treatments according to the techniques given in the introduction.

These values, used to illustrate the IS method and to compare its results to gamma analysis results in QA plan evaluation, were properly chosen according to the volume of the isodose structure. The higher the volume, the higher the OR and VR threshold values.

TABLE I

OR and VR threshold values
for PTV and OARs structures.

|  | OR | VR |
| --- | --- | --- |
| PTVmin | 0.99 | 0.98 |
| PTVmax | 0.80 | 0.66 |
| Spinal Cord | 0.80 | 0.66 |
| Right Parotid | 0.90 | 0.90 |
| Left Parotid | 0.90 | 0.90 |

It is important to observe that formulas (3) and (4) in step l) are adopted to value an adequate PTV coverage (a fraction X of the PTV volume receives at least Y dose). The verification about the maximum dose accepted in PTV is carried out by considering the PTV in the same way as an OAR (i.e. X cm³ of the PTV volume can receive no more than Y dose). In this case formulas (1) and (2) of step k) must be adopted.

The Error-Included Plans

The plans adopted for dose distribution comparison were Head and Neck plans.

This was because these are the most challenging and complex plans because of the simultaneous presence of many OARs (spinal cord, optic nerves, brain stem, optic chiasma, parotids, etc.) and for the severity of complication in case of injury (blindness, xerostomia, myelitis, etc.). As a consequence, the clinical implications due to dose distribution discrepancies are potentially higher in these plans. Therefore, the need for a methodology for pass/fail decisions, that is more sensitive to clinical implications generated by discrepancies between TPS and measured dose distributions, is more urgent for Head and Neck plans.

A total of 33 flawed VMAT plans were generated perturbing the respective reference (TPS) plans with six different types of errors. Eighteen flawed plans were generated and calculated with Eclipse TPS (version 13.0.26, Varian Medical Systems, Palo Alto, CA) using 6 MV photon arcs with 120-leaf MLC, while the remaining fifteen flawed plans were generated and calculated with Monaco TPS (version 5.11.02, Elekta CMS, Maryland Heights, MO, USA), using 6 MV photon arcs with 160-leaf MLC. All CT images were acquired with 3 mm slice thickness and 120 kVp voltage. All plans were calculated with 2.5 mm grid dose resolution and all modified (or error-included) plans were calculated using the same TPS software with the same settings adopted for the corresponding reference plan (error-free plan). All reference plans (or error-free plans) were normalized to 100% of dose prescription (70 Gy) at target mean. From now on, the error-free plans will be referred to as "TPS" plans, while the error-included plans (flawed plans) will be referred to as "measured" plans.

Successively, the following six types of error were introduced separately in each original (TPS) plan:
a) energy modification. This error was simulated by doubling the existing 6 MV arcs of the error-free plan and changing their energy at 18 MV. Therefore, the modified plan contained both 6 and 18 MV arcs with 6 MV arcs weighted to contribute for only 85% of prescription dose while the remaining 15% was due to 18 MV arcs. This error was introduced in plans 1 to 3;
b) inhomogeneity correction. In this case a modified plan was generated by recalculating the reference plan without considering tissue inhomogeneity (all body tissues were considered at the same density as water). This error was introduced in plans 4 to 9;
c) dose output. The error-included plan was simply obtained from the reference plan after changing the normalization from 100% to 98% of dose prescription at target mean (in this case a dose output of approximately +2% of the linear accelerator was simulated). This error was introduced in plans 10 to 15;
d) collimator rotation. The error-included plan was generated by increasing the collimator angle of each arc in the reference plan by +2° (in this case a 2° error for collimator angle rotation was established). This error was introduced in plans 16 to 21;
e) isocentre shift. The error-included plan had the isocentre moved by +1 mm in each of the X, Y and Z directions for each arc of the reference plan. This error was introduced in plans 22 to 27;
f) couch rotation. The modified plan was generated by increasing by +2° the couch angle of each arc in the reference plan (in this case a 2 degree error calibration for couch angle was simulated). This error was introduced in plans 28 to 33.

All plans were imported into the Computational Environment for Radiotherapy Research (CERR, Washington University) developed using MATLAB® (MathWorks, MA) for gamma analysis evaluation (Deasy et al.[15]). Global 2%/2 mm and 3%/3 mm gamma with 10% lower dose threshold were calculated separately for PTV, spinal cord, right and left parotids (organ-specific gamma passing rate) and for entire body (overall gamma passing rate). In this work, the measured plan was considered to pass gamma analysis when the gamma passing rate exceeded 90% (Ezzell et al.[16]), while it was sufficient that just one parameter (OR and/or VR) exceeded the tolerance level for a single structure to consider the measured plan as clinically unacceptable according to the IS (Isodose Structure) method. Lastly, the pass/fail decisions obtained applying the gamma analysis were compared to those obtained by the IS method.

Results

The IS method analysis is organ-specific because OR and VR factors are calculated specifically for each isodose structure. Therefore, when a measured plan fails the IS analysis, the structures (OARs or PTV) not respecting the clinical acceptability are known.

Instead, the gamma analysis can adopt the overall gamma passing rate or the recommended organ-specific gamma passing rate. For this reason, the results of IS method and gamma analysis were compared by considering alternately the overall and the organ specific gamma passing rate.

Overall Gamma Analysis and IS Method Comparison

For each measured plan both the overall 2%/2 mm and 3%/3 mm global gamma passing rates were separately registered. The 3%/3 mm gamma analysis with gamma passing rate superior to 90% is the most commonly adopted criteria, nevertheless several studies have demonstrated its unreliability for treatment plan acceptability (Heilemann et al.[17], Nelms et al.[18]). For this reason, the 3%/3 mm gamma analysis will no longer be considered in this paper but will be mentioned simply for integrity. Subsequently, all VR and OR values were calculated according to the described procedure.

Following below, the summary of the results is reported. A graphic representation of the results was given in FIG. 2A.

Case a) The Overall gamma analysis corresponds to the IS method. Eight of the 33 measured plans passed the 2%/2 mm overall gamma analysis and the IS analysis simultaneously while 10 of the 33 plans failed both. The overall gamma analysis corresponds to the IS analysis for a combined total of 18 of the 33 plans. As this work wants to dwell on the opposite pass/fail decisions of gamma analysis and IS method, case a) will no longer be examined.

Case b) The Overall gamma analysis (passed) does not correspond to the IS method (not passed). It occurred in 13 of the 33 plans. Furthermore, in 2 of these 13 plans the IS analysis showed that the exclusive DVH analysis was not sufficient to assess the clinical acceptability of the measured plans. In fact in both cases reported, even though the DVH curves were similar for the measured and the TPS plans, a poor spatial correspondence was detected for the PTV maximum dose. Case b) included all those plans with large dose discrepancies (sub-case b1) that gamma analysis was unable to detect (and that were responsible for the clinical quality reduction of the measured plan) as well as those plans with minor dose differences (considered by gamma analysis as compatible with TPS dose distribution), that were otherwise decisive for clinical unacceptability (sub-case b2).

Figure 3:
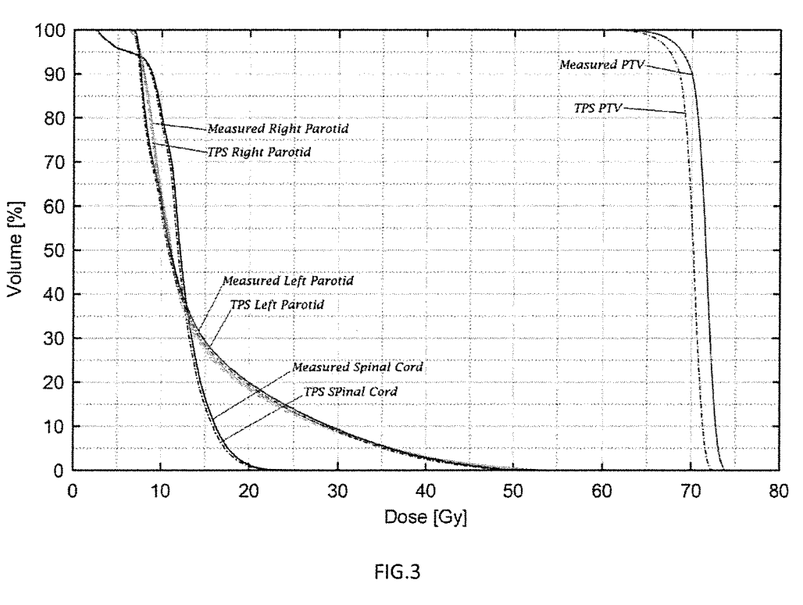
FIG. 3. shows the DVH curves comparison between the TPS plan and the measured plan of case 11 wherein the measured plan included the dose output error. The overall 2%/2 mm gamma passing rate was 98.9% while IS method detected an overdose for PTV structure as is clearly seen.

The measured plans with the dose-output error included belong in the sub-case b1). All these plans had a high gamma passing rate, nevertheless the DVH comparisons with the reference (TPS) plans showed a substantial difference for PTV curves (see FIG. 3). The IS analysis detected a generalized over-exposition for all organs (VR<1 in all plans for dose level: $D_{PTVmax}$ $D_{Spinal2cc}$, $D_{ParR}$ or $D_{ParL}$) with threshold values exceeded only in the VR and OR indexes of the $D_{PTVmax}$ dose level. Therefore the IS method correctly drew attention particularly to the PTV over-exposition.

Figure 4:
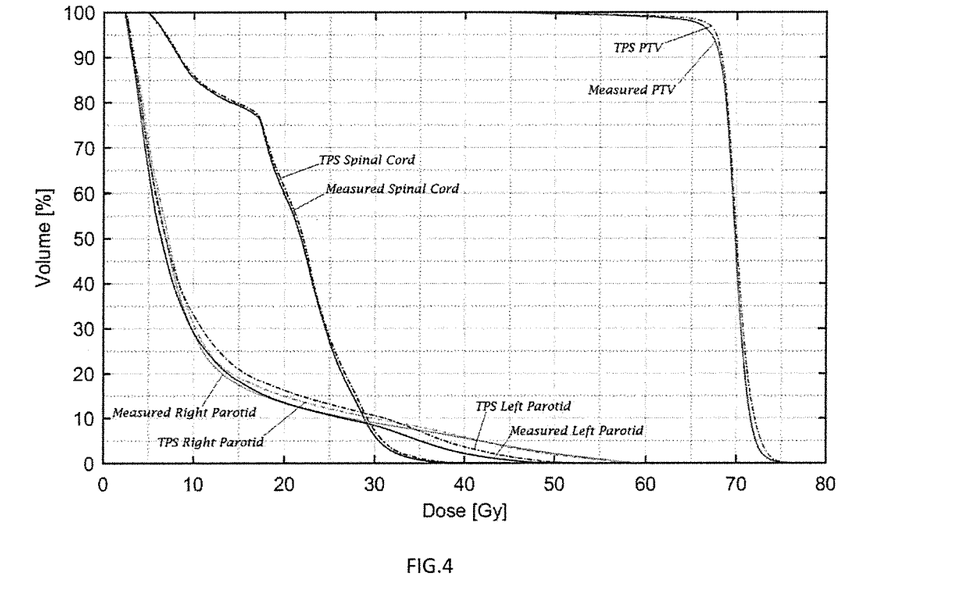
FIG. 4 shows the DVH curves comparison between the TPS plan and the measured plan of case 22 wherein the measured plan included the isocentre shift error. The DVH curves comparison seemed to confirm the clinical acceptability of the measured plan, nevertheless the IS method could detect a spatial correspondence failure for the PTV maximum dose (see FIG. 5).
Figure 5:
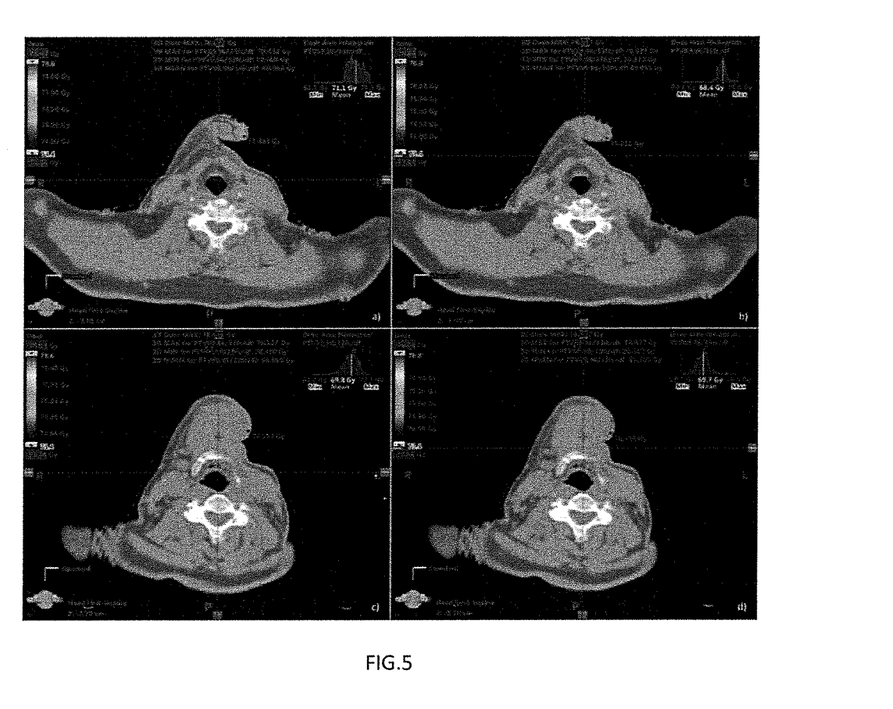
FIG. 5 shows the spatial correspondence failure of the PTV maximum dose of case 22 in two different CT images. The $D_{PTVmax}$ isodose level is shown in a) and c) for the TPS plan and in b) and d) for the measured plan. The TPS $D_{PTVmax}$ isodose structure is larger than the MSR $D_{PTVmax}$ isodose structure as shown by a) and b) comparison. Nevertheless, in the same CT slice, the $D_{PTVmax}$ isodose level is present in the measured plan (d)) and is absent in the TPS plan (c)).

Plan 22 is mentioned for sub-case b2). The overall 2%/2 mm gamma passing rate of plan 22 was greater than 90% and even the DVH curves comparison seemed to confirm the clinical acceptability of the measured plan (see FIG. 4). Nevertheless, the IS method detected a spatial correspondence failure for the PTV maximum dose. The failure was clearly indicated by the low value of the OR index (OR=0.33) for the $D_{PTVmax}$ dose level. FIG. 5 shows in the measured plan a shift of the maximum dose on different CT slices. Without doubt, the spatial mismatch of the maximum dose is important for the clinical approval of the measured plan and it should always be brought to the attention of the operator. Moreover, the maximum dose shift could not be detected by DVH comparison or by gamma analysis while this was possible only with IS analysis.

Case c) The Overall gamma analysis (failed) does not correspond to the IS method (passed). Two of 33 plans passed the IS analysis but failed the overall gamma analysis. This case included those measured plans with noticeable dose differences (detected by the gamma analysis) that were not responsible for an evident reduction of treatment plan quality. Indeed, substantial dose differences can even represent an improvement of the treatment plan quality if, for instance, the dose difference is due to the dose reduction in an OAR.

Plan 23 belongs to case c) and was the only flawed plan out of six with the isocentre-shift error included, to pass IS analysis and to not pass gamma analysis (overall gamma passing rate only 83.2%). The main DVH differences are those relative to the right and left parotid curves. The left parotid mean dose was 14.4 Gy and 15.3 Gy respectively in the TPS and in the measured plan while the right parotid mean dose was 14.5 Gy in the TPS plan and 13.5 Gy in the measured plan. If the specific gamma passing rate for each OAR and PTV is considered, the lowest values are registered specifically for parotids (specific gamma passing rate 71.2% for right and 73% for left parotid).

Therefore, summing cases b) and c), the overall gamma analysis does not correspond to the IS analysis for a combined total of 15 out of the 33 plans.

Organ-Specific Gamma Analysis and IS Method Comparison

Overall gamma analysis can be ineffective for clinically detecting relevant dose differences if the organ involved in dose discrepancies covers a very small volume (such as optic chiasma) or if the dose discrepancy is condensed in a small part of the organ (such as an unacceptably high dose to a small part of the spinal cord). For this reason it would be better to use the organ-specific gamma passing rate over the overall gamma. It is also true that an organ-specific low passing rate does not always or necessarily correspond to a reduction in clinical quality of the treatment plan. Nevertheless the organ-specific gamma passing rate, as recommended in TG 218[11], generally speaking allows a more accurate evaluation of the measured plans.

In this study, when the organ-specific (OAR or PTV) gamma passing rate was considered, gamma analysis and IS analysis diverged (had opposite pass/fails results) in 47 out of 165 cases. As in the Overall Gamma Analysis, three cases can be identified:

Case a) The Organ-specific gamma analysis corresponds to the IS method. This case occurred in 118 out of 165 organs. In particular, in plans 6 and 7 (plans with inhomogeneity correction error included) a local passing rate lower than 90% was detected for PTV. The clinical quality reduction for PTV was effectively confirmed by the IS method which detected OR and VR values lower than acceptance thresholds for PTVmax dose level (PTV maximum dose).

Case b) The Organ-specific gamma analysis (passed) does not correspond to the IS method (not passed). This case occurred in 15 out of 165 organs. In plans 4 and 9 the IS method detected low OR and VR values for the $D_{PTVmax}$ dose level but the specific gamma passing rate for PTV was higher than 90% (90.3% and 90.2% respectively). In fact DVH metrics detected that in plan 4 the volume related to the $D_{PTVmax}$ dose level passed from 2 cm$^3$ (i.e. the volume of TPS $D_{PTVmax}$ isodose structure) to 6.5 cm$^3$ (i.e. the volume of MSR $D_{PTVmax}$ isodose structure).

Figure 6:
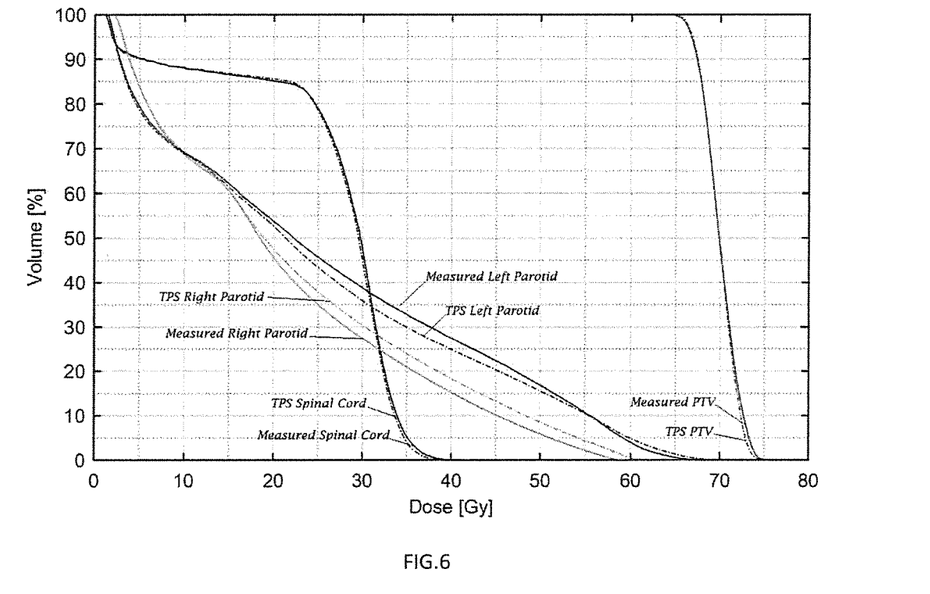
FIG. 6 shows the DVH curves comparison between the TPS plan and the measured plan of case 19. The measured plan included the collimator rotation error. The left parotid average dose in the measured plan was slightly higher while the right parotid average dose in the measured plan was even lower than expected in the TPS plan.
Figure 7:
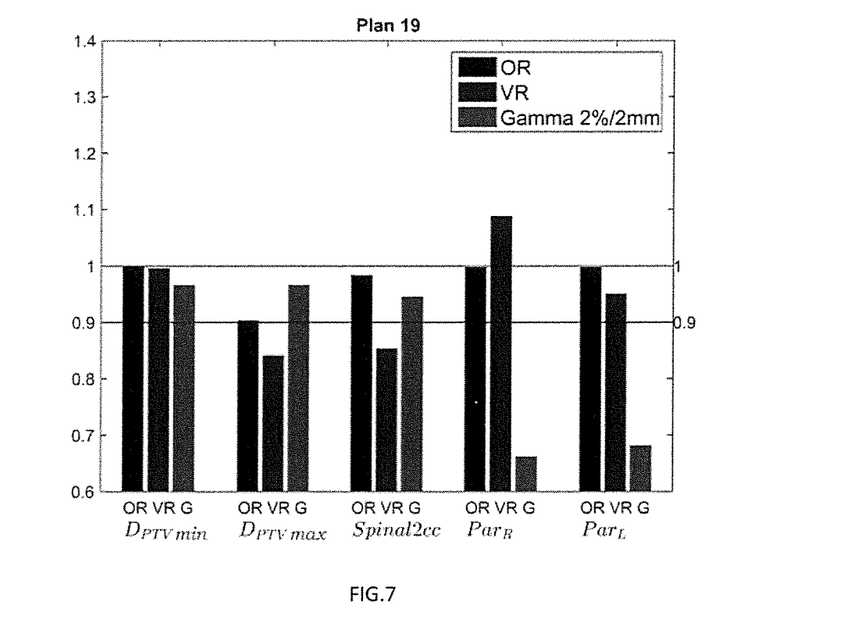
FIG. 7. The indexes OR, VR and Organ-Specific Gamma Passing Rate of plan 19 are shown for the Isodose Structures $D_{PTVmin}$, $D_{PTVmax}$, $D_{Spinal2cc}$, $D_{ParR}$ and $D_{ParL}$.

Case c) The Organ-specific gamma analysis (failed) does not correspond to the IS method (passed). This case occurred in 32 out of 165 organs. Here the case of plan 19 is reported. The DVH curves of the measured and of the TPS plans are shown in FIG. 6. The left parotid average dose in the measured plan was slightly higher than expected in the TPS plan (25.4 Gy and 24.7 Gy, respectively). The right parotid average dose in the measured plan was even lower than expected in the TPS plan (21.1 Gy and 22.3 Gy, respectively) considering it was a clinically favorable condition. Nevertheless, in both cases, the specific gamma passing rate was only 68.1% for the left parotid and 66.2% for the right parotid (see FIG. 7). Once again, the gamma analysis was unable to separate clinical favorable from clinical unfavorable conditions.

Figure 2:
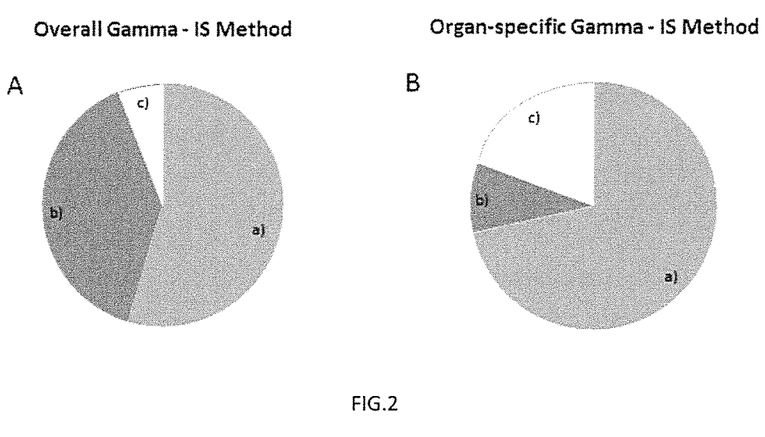
FIG. 2 shows a Summary of the results for the comparison between the IS method and the Overall Gamma Analysis (A) or the Organ-Specific Gamma Analysis (B). In particular, in case a) the IS results correspond to Gamma Analysis, in case b) plans passed Gamma Analysis but not passed IS analysis, while in case c) plans passed IS analysis but not passed Gamma Analysis.

A graphic representation of the results was given in FIG. 2B.

In this application, new method for patient-specific QA plan acceptance was described and a demonstration of its application in thirty three head and neck plans was given. The results of the IS method for pass/failing decisions were compared to gamma analysis results and the opposed responses ensuing from the application of the two methods were further investigated. The investigation was not conducted to consider the dose discrepancies "per se" but rather to appraise if the measured plan could be considered as clinically acceptable according to the chosen patient-specific CRDVCs.

The measured plans were obtained including specific errors in the corresponding TPS plans. It is useful to observe that the error types adopted for TPS plan modification were irrelevant. In fact, the aim of this study was to show the difference between IS method and gamma analysis (or DVH metrics in some cases), regardless of how the measured plan was previously obtained by adopting the TPS plan. In order to maximize the clinical relevance due to dose changes in the measured plan, the preference was for those types of error able to affect the dose delivered to each structure (PTV and OARs) in its entirety and all structures simultaneously.

Three important limits constitute the reason for the inadequacy of gamma analysis for the clinical assessment[19-20] of a TPS plan:

a) same tolerance for different dose levels in the same OAR. A large dose increment (beyond the gamma criteria of acceptability) in an OAR can still be clinically compatible at low doses (or at doses far from the OAR dose constraint). On the contrary, a small dose increment, even if acceptable by gamma analysis, can be harmful at higher doses (or at doses next to the OAR dose constraint);

b) same tolerance for equal dose levels in different OARs. For this aim, let us consider two points with the same expected dose of 45 Gy and the same dose increment of 2 Gy between the measured and the TPS dose distribution. If the first point is placed in the general healthy tissue while the second is in the spinal cord, the dose increment of 2 Gy will have a clinical relevance (not detected by gamma analysis) which is quite different for the two points considered;

c) positive or negative dose difference. This is the case of dose points which are equally and contrarily differentiated. Gamma analysis considers only the absolute dose difference for the pass/fail decision but an overdosage for an OAR certainly has a different clinical meaning with respect to an under-dosage.

These three intrinsic limits of gamma analysis are the cause of its inadequacy in obtaining a correct clinical evaluation of radiotherapic treatment plans. Examples of this inadequacy were provided by case 11 of FIG. 3 (gamma analysis passed) and by case 19 of FIG. 6 (gamma analysis not passed) for Overall and Organ-specific gamma analysis respectively. Moreover, this was confirmed by several studies that raised doubts about gamma analysis effectiveness. Zhen et al.[8] found that gamma passing rates do not predict the clinical impact on the patient as can be observed by changes in the DVH values for the PTV and organs at risk (OARs). Cases 11 and 19 mentioned showed dose differences between TPS and measured dose distributions that were easily detectable by DVH metrics.

Unfortunately, a plan analysis which considers only DVH metrics cannot be really thoroughly comprehensive. In fact DVH is a powerful tool when used to summarize the main dose features of PTV and OARs but lacks any information regarding spatial dose distribution. For this, let us consider a treatment plan with partial re-irradiation of the spinal cord. The highest spinal cord dose (such as 44 Gy) is not acceptable if it is located in the tract already exposed. Unfortunately, this condition cannot be evaluated through DVH analysis. An example in this work was provided by case 22. Therefore, a methodology that evaluates all the CRDVCs for PTV and OARs as well as comparing the spatial dose distributions of TPS and measured plans is needed.

The IS method summarizes the characteristics of DVH based analysis (to evaluate the CRDVCs) with the capability of evaluating the spatial correspondence between the TPS and the measured dose distributions. Indeed the IS method includes and integrates the DVH analysis. With this aim, it considers two parameters: OR (overlapping ratio) and VR (volume ratio). The OR and VR parameters are computed for each OAR or PTV structure only for those selected dose levels of CRDVCs. The OR parameter accounts for the spatial dose correspondence while the VR parameter accounts for under/over-exposure of the structures investigated. Indeed, the VR parameter quantifies aspects that are already detectable with DVH based analysis. VR values greater than 1 indicate a more spared OAR (or a better covered PTV) in the measured plan compared to the TPS plan. The OR parameter of the IS method is the decisive addition to DVH based analysis. It measures the percentage of the measured isodose structure (MSR $D_i$) effectively contained in the analogue TPS isodose structure isotropically expanded for alpha (2 mm in this embodiment). Conversely, the OR factor for $D_{PTVmin}$ dose level is the percentage of TPS $D_{PTVmin}$ isodose structure contained in the expanded measured EXP-MSR $D_{PTVmin}$ isodose structure.

The invention claimed is:

1. A method for verifying a calculated radiation dose distribution produced by TPS (treatment planning system) software, in a patient treatment plan of radiotherapy, before delivery of the radiation dose to a patient, in order to avoid clinically relevant dose differences in tumors and organs at risk, the method comprising the steps of:
   converting operator selected isodose levels into volumetric 3D structures termed isodose structures; and
   using the isodose structures to verify operator selected CRDVCs (Clinical Relevant Dose Volumetric Conditions) and their relative spatial correspondence thus detecting all the dose differences in organs at risk (OARs) and in PTV (Planning Target Volume) responsible for inadequacy of gamma analysis for the clinical assessment of a TPS plan, and
   delivering the patient treatment plan of radiotherapy to the patient.

2. The method of claim 1 wherein the isodose structures are processed with the purpose of verifying each CRDVC (clinically relevant dose-volumetric conditions); for this aim, only the isodose level related to a CRDVC being converted into a 3D structure.

3. The method of claim 2, wherein with the isodose structures the indexes Volume Ratio (VR) and Overlapping Ratio (OR) are configured to evaluate the following conditions:
   the chosen CRDVCs for all PTV and OARs are valid also in the measured plan;
   the existence of spatial correspondence between the X volume (receiving Y dose) of a specific OAR or PTV in the TPS plan and the analogous volume in the measured plan.

4. The method of claim 2, wherein both indexes (OR and VR) must contemporarily exceed the relative threshold values adopted per patient in the specific case by the individual operator, to consider the measured plan as clinically acceptable.

5. The method according to claim 2, wherein:
   a) All PTVs and OARs contours are firstly converted to high resolution segments, in order to carry out Boolean operations or geometric expansions in particular on small structures;
   b) Choice of CRDVCs to select the isodose level related to each CRDVC;
   c) Conversion of selected isodose levels to structures in TPS plan wherein the following structures are generated: *TPS $D_{PTVmin}$, *TPS $D_{PTVmax}$ and *TPS $D_{OARi}$ (i stands for each OAR);
   d) Conversion of selected isodose levels to structures in measured plan wherein the following structures are generated: *MSR $D_{PTVmin}$, *MSR $D_{PTVmax}$ and *MSR $D_{OARi}$ (i stands for each OAR);
   e) Verifying that all structures obtained by the conversion of isodose levels are of high resolution type;
   f) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi) (i stands for each OAR);
   g) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi) (i stands for each OAR);
   h) Choice the amount of the expansion;
   i) Development of the following expanded structures in the TPS plan: EXP-TPS $D_{OARi}$ (obtained through isotropic expansion of TPS $D_{OARi}$) and EXP-TPS $D_{PTVmax}$ (obtained through isotropic expansion of TPS $D_{PTVmax}$);
   j) Development of the following expanded structure in measured plan: EXP-MSR $D_{PTVmin}$ (obtained through isotropic expansion of MSR $D_{PTVmin}$);
   k) Calculation of OR (Overlapping Ratio) factors and VR (Volume Ratio) factors defined as $$OR_{OARi} = \frac{MSR\ D_{OARi} \cap EXP - TPS\ D_{OARi}}{MSR\ D_{OARi}} \text{ and} \quad (1)$$

$$VR_{OARi} = \frac{TPS\ D_{OARi}}{MSR\ D_{OARi}} \quad (2)$$

for each OAR and for the $D_{PTVmax}$ dose level (i.e. the upper dose limit for PTV); if MSR $D_i$ in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1;
   l) Calculation of OR (Overlapping Ratio) factors and VR (Volume Ratio) factors defined as $$OR_{PTVmin} = \frac{TPS\ D_{PTVmin} \cap EXP - MSR\ D_{PTVmin}}{TPS\ D_{PTVmin}} \text{ and} \quad (3)$$

$$VR_{PTVmin} = \frac{MSR\ D_{PTVmin}}{TPS\ D_{PTVmin}} \quad (4)$$

only for the $D_{PTVmin}$ isodose level (i.e. the lower dose limit for PTV).

6. The method of claim 1, wherein for each isodose structure the relative indexes Volume Ratio (VR) and Overlapping Ratio (OR) are configured to evaluate the following conditions:
   the chosen CRDVCs for all PTV and OARs are valid also in the measured plan;
   the existence of spatial correspondence between the X volume (receiving Y dose) of a specific OAR or PTV in the TPS plan and the analogous volume in the measured plan.

7. The method of claim 6, wherein both indexes (OR and VR) must contemporarily exceed the relative threshold values adopted per patient in the specific case by the individual operator, to consider the measured plan as clinically acceptable.

8. The method according to claim 6, wherein:
   a) All PTVs and OARs contours are firstly converted to high resolution segments, in order to carry out Boolean operations or geometric expansions in particular on small structures;

b) Choice of CRDVCs to select the isodose level related to each CRDVC;

c) Conversion of selected isodose levels to structures in TPS plan wherein the following structures are generated: *TPS $D_{PTVmin}$, *TPS $D_{PTVmax}$ and *TPS $D_{OARi}$ (i stands for each OAR);

d) Conversion of selected isodose levels to structures in measured plan wherein the following structures are generated: *MSR $D_{PTVmin}$, *MSR $D_{PTVmax}$ and *MSR $D_{OARi}$ (i stands for each OAR);

e) Verifying that all structures obtained by the conversion of isodose levels are of high resolution type;

f) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi) (i stands for each OAR);

g) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi). (i stands for each OAR);

h) Choice the amount of the expansion;

i) Development of the following expanded structures in the TPS plan: EXP-TPS $D_{OARi}$ (obtained through isotropic expansion of TPS $D_{OARi}$) and EXP-TPS $D_{PTVmax}$ (obtained through isotropic expansion of TPS $D_{PTVmax}$);

j) Development of the following expanded structure in measured plan: EXP-MSR $D_{PTVmin}$ (obtained through isotropic expansion of MSR $D_{PTVmin}$);

k) Calculation of OR (Overlapping Ratio) factors and VR (Volume Ratio) factors defined as $$OR_{OARi} = \frac{MSR\ D_{OARi} \cap EXP - TPS\ D_{OARi}}{MSR\ D_{OARi}} \text{ and} \quad (1)$$

$$VR_{OARi} = \frac{TPS\ D_{OARi}}{MSR\ D_{OARi}} \quad (2)$$

for each OAR and for the $D_{PTVmax}$ dose level (i.e. the upper dose limit for PTV) if MSR D; in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1;

l) Calculation of OR (Overlapping Ratio) factors and VR (Volume Ratio) factors defined as $$OR_{PTVmin} = \frac{TPS\ D_{PTVmin} \cap EXP - MSR\ D_{PTVmin}}{TPS\ D_{PTVmin}} \text{ and} \quad (3)$$

$$VR_{PTVmin} = \frac{MSR\ D_{PTVmin}}{TPS\ D_{PTVmin}} \quad (4)$$

only for the $D_{PTVmin}$ isodose level (i.e. the lower dose limit for PTV).

9. The method of claim 1, wherein both indexes (OR and VR) must contemporarily exceed the relative threshold values adopted per patient in the specific case by the individual operator, to consider the measured plan as clinically acceptable.

10. The method according to claim 1, wherein:

a) All PTVs and OARs contours are firstly converted to high resolution segments, in order to carry out Boolean operations or geometric expansions in particular on small structures;

b) Choice of CRDVCs to select the isodose level related to each CRDVC;

c) Conversion of selected isodose levels to structures in TPS plan wherein the following structures are generated: *TPS $D_{PTVmin}$, *TPS $D_{PTVmax}$ and *TPS $D_{OARi}$ (i stands for each OAR);

d) Conversion of selected isodose levels to structures in measured plan wherein the following structures are generated: *MSR $D_{PTVmin}$, *MSR $D_{PTVmax}$ and *MSR $D_{OARi}$ (i stands for each OAR);

e) Verifying that all structures obtained by the conversion of isodose levels are of high resolution type;

f) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi) (i stands for each OAR);

g) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi) (i stands for each OAR);

h) Choice the amount of the expansion;

i) Development of the following expanded structures in the TPS plan: EXP-TPS $D_{OARi}$ (obtained through isotropic expansion of TPS $D_{OARi}$) and EXP-TPS $D_{PTVmax}$ (obtained through isotropic expansion of TPS $D_{PTVmax}$);

j) Development of the following expanded structure in measured plan: EXP-MSR $D_{PTVmin}$ (obtained through isotropic expansion of MSR $D_{PTVmin}$);

k) Calculation of OR (Overlapping Ratio) factors and VR (Volume Ratio) factors defined as $$OR_{OARi} = \frac{MSR\ D_{OARi} \cap EXP - TPS\ D_{OARi}}{MSR\ D_{OARi}} \text{ and} \quad (1)$$

$$VR_{OARi} = \frac{TPS\ D_{OARi}}{MSR\ D_{OARi}} \quad (2)$$

for each OAR and for the $D_{PTVmax}$ dose level (i.e. the upper dose limit for PTV)); when MSR $D_i$ in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1;

l) Calculation of OR (Overlapping Ratio) factors and VR (Volume Ratio) factors defined as $$OR_{PTVmin} = \frac{TPS\ D_{PTVmin} \cap EXP - MSR\ D_{PTVmin}}{TPS\ D_{PTVmin}} \text{ and} \quad (3)$$

$$VR_{PTVmin} = \frac{MSR\ D_{PTVmin}}{TPS\ D_{PTVmin}} \quad (4)$$

only for the $D_{PTVmin}$ isodose level (i.e. the lower dose limit for PTV).

11. A non-transitory computer-readable medium on which is stored a computer program comprising instructions that, when executed by a computer, cause the computer to perform a method for verifying a calculated radiation dose distribution produced by TPS (treatment planning system) software, in a patient treatment plan of radiotherapy, before delivery of the radiation dose to a patient, in order to avoid clinically relevant dose differences in tumors and organs at risk, the method comprising the steps of:
- converting operator selected isodose levels into volumetric 3D structures termed isodose structures; and
- using the isodose structures to verify operator selected CRDVCs (Clinical Relevant Dose Volumetric Conditions) and their relative spatial correspondence thus detecting all the dose differences in organs at risk (OARs) and in PTV (Planning Target Volume) responsible for inadequacy of gamma analysis for the clinical assessment of a TPS plan.

12. The non-transitory computer-readable medium on which is stored a computer program comprising instructions of claim 11, wherein the isodose structures are processed with the purpose of verifying each CRDVC (clinically relevant dose-volumetric conditions); for this aim, only the isodose level related to a CRDVC being converted into a 3D structure.

13. The non-transitory computer-readable medium on which is stored a computer program comprising instructions of claim 12, wherein for each isodose structure the relative indexes Volume Ratio (VR) and Overlapping Ratio (OR) are configured to evaluate the following conditions:
- the chosen CRDVCs for all PTV and OARs are valid also in the measured plan;
- the existence of spatial correspondence between the X volume (receiving Y dose) of a specific OAR or PTV in the TPS plan and the analogous volume in the measured plan.

14. The non-transitory computer-readable medium on which is stored a computer program comprising instructions of claim 13, wherein both indexes (OR and VR) must contemporarily exceed the relative threshold values adopted per patient in the specific case by to the individual operator, to consider the measured plan as clinically acceptable.

15. The non-transitory computer-readable medium on which is stored a computer program comprising instructions of claim 14, wherein:
m) All PTVs and OARs contours are firstly converted to high resolution segments, in order to carry out Boolean operations or geometric expansions in particular on small structures;
n) Choice of CRDVCs to select the isodose level related to each CRDVC;
o) Conversion of selected isodose levels to structures in TPS plan wherein the following structures are generated: *TPS $D_{PTVmin}$, *TPS $D_{PTVmax}$ and *TPS $D_{OARi}$ (i stands for each OAR);
p) Conversion of selected isodose levels to structures in measured plan wherein the following structures are generated: *MSR $D_{PTVmin}$, *MSR $D_{PTVmax}$ and *MSR $D_{OARi}$ (i stands for each OAR);
q) Verifying that all structures obtained by the conversion of isodose levels are of high resolution type;
r) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi) (i stands for each OAR);
s) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi). (i stands for each OAR);
t) Choice the amount of the expansion;
u) Development of the following expanded structures in the TPS plan: EXP-TPS $D_{OARi}$ (obtained through isotropic expansion of TPS $D_{OARi}$) and EXP-TPS $D_{PTVmax}$ (obtained through isotropic expansion of TPS $D_{PTVmax}$);
v) Development of the following expanded structure in measured plan: EXP-MSR $D_{PTVmin}$ (obtained through isotropic expansion of MSR $D_{PTVmin}$);
w) Calculation of OR (Overlapping Ratio) factors and VR (Volume Ratio) factors defined as $$OR_{OARi} = \frac{MSR\ D_{OARi} \cap EXP-TPS\ D_{OARi}}{MSR\ D_{OARi}} \text{ and} \quad (1)$$

$$VR_{OARi} = \frac{TPS\ D_{OARi}}{MSR\ D_{OARi}} \quad (2)$$

for each OAR and for the $D_{PTVmax}$ dose level (i.e. the upper dose limit for PTV); if MSR D; in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1;
x) Calculation of OR (Overlapping Ratio) factors and VR (Volume Ratio) factors defined as $$OR_{PTVmin} = \frac{TPS\ D_{PTVmin} \cap EXP-MSR\ D_{PTVmin}}{TPS\ D_{PTVmin}} \text{ and} \quad (3)$$

$$VR_{PTVmin} = \frac{MSR\ D_{PTVmin}}{TPS\ D_{PTVmin}} \quad (4)$$

only for the $D_{PTVmin}$ isodose level (i.e. the lower dose limit for PTV).

16. The non-transitory computer-readable medium on which is stored a computer program comprising instructions of claim 15, wherein with the isodose structures the indexes Volume Ratio (VR) and Overlapping Ratio (OR) are configured to evaluate the following conditions:
- the chosen CRDVCs for all PTV and OARs are valid also in the measured plan;
- the existence of spatial correspondence between the X volume (receiving Y dose) of a specific OAR or PTV in the TPS plan and the analogous volume in the measured plan.

17. The non-transitory computer-readable medium on which is stored a computer program comprising instructions of claim 16, wherein both indexes (OR and VR) must contemporarily exceed the relative threshold values adopted per patient in the specific case by the individual operator, to consider the measured plan as clinically acceptable.

18. The non-transitory computer-readable medium on which is stored a computer program comprising instructions of claim 17, wherein both indexes (OR and VR) must contemporarily exceed the relative threshold values adopted per patient in the specific case by the individual operator, to consider the measured plan as clinically acceptable.

19. The non-transitory computer-readable medium on which is stored a computer program comprising instructions of claim 18, wherein:

a) All PTVs and OARs contours are firstly converted to high resolution segments, in order to carry out Boolean operations or geometric expansions in particular on small structures;
b) Choice of CRDVCs to select the isodose level related to each CRDVC;
c) Conversion of selected isodose levels to structures in TPS plan wherein the following structures are generated: *TPS $D_{PTVmin}$, *TPS $D_{PTVmax}$ and *TPS $D_{OARi}$ (i stands for each OAR);
d) Conversion of selected isodose levels to structures in measured plan wherein the following structures are generated: *MSR $D_{PTVmin}$, *MSR $D_{PTVmax}$ and *MSR $D_{OARi}$ (i stands for each OAR);
e) Verifying that all structures obtained by the conversion of isodose levels are of high resolution type;
f) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi) (i stands for each OAR);
g) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi) (i stands for each OAR);
h) Choice the amount of the expansion;
i) Development of the following expanded structures in the TPS plan: EXP-TPS $D_{OARi}$ (obtained through isotropic expansion of TPS $D_{OARi}$) and EXP-TPS $D_{PTVmax}$ (obtained through isotropic expansion of TPS $D_{PTVmax}$);
j) Development of the following expanded structure in measured plan: EXP-MSR $D_{PTVmin}$ (obtained through isotropic expansion of MSR $D_{PTVmin}$);
k) Calculation of OR (Overlapping Ratio) factors and VR (Volume Ratio) factors defined as $$OR_{OARi} = \frac{MSR\ D_{OARi} \cap EXP - TPS\ D_{OARi}}{MSR\ D_{OARi}} \quad (1)$$

and $$VR_{OARi} = \frac{TPS\ D_{OARi}}{MSR\ D_{OARi}} \quad (2)$$

for each OAR and for the $D_{PTVmax}$ dose level (i.e. the upper dose limit for PTV). If MSR $D_i$ in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1;
l) Calculation of OR (Overlapping Ratio) factors and VR (Volume Ratio) factors defined as $$OR_{PTVmin} = \frac{TPS\ D_{PTVmin} \cap EXP - MSR\ D_{PTVmin}}{TPS\ D_{PTVmin}} \quad (3)$$

and $$VR_{PTVmin} = \frac{MSR\ D_{PTVmin}}{TPS\ D_{PTVmin}} \quad (4)$$

only for the $D_{PTVmin}$ isodose level (i.e. the lower dose limit for PTV).

20. The non-transitory computer-readable medium on which is stored a computer program comprising instructions of claim 19, wherein:

m) All PTVs and OARs contours are firstly converted to high resolution segments, in order to carry out Boolean operations or geometric expansions in particular on small structures;
n) Choice of CRDVCs to select the isodose level related to each CRDVC;
o) Conversion of selected isodose levels to structures in TPS plan wherein the following structures are generated: *TPS $D_{PTVmin}$, *TPS $D_{PTVmax}$ and *TPS $D_{OARi}$ (i stands for each OAR);
p) Conversion of selected isodose levels to structures in measured plan wherein the following structures are generated: *MSR $D_{PTVmin}$, *MSR $D_{PTVmax}$ and *MSR $D_{OARi}$ (i stands for each OAR);
g) Verifying that all structures obtained by the conversion of isodose levels are of high resolution type;
r) Development of the following structures in the TPS plan: TPS $D_{PTVmin}$ (obtained through the intersection of *TPS $D_{PTVmin}$ and PTV), TPS $D_{PTVmax}$ (obtained through the intersection of *TPS $D_{PTVmax}$ and PTV), TPS $D_{OARi}$ (obtained through the intersection of *TPS $D_{OARi}$ and OARi) (i stands for each OAR);
s) Development of the following structures in the measured plan: MSR $D_{PTVmin}$ (obtained through the intersection of *MSR $D_{PTVmin}$ and PTV), MSR $D_{PTVmax}$ (obtained through the intersection of *MSR $D_{PTVmax}$ and PTV), MSR $D_{OARi}$ (obtained through the intersection of *MSR $D_{OARi}$ and OARi) (i stands for each OAR);
t) Choice the amount of the expansion;
u) Development of the following expanded structures in the TPS plan: EXP-TPS $D_{OARi}$ (obtained through isotropic expansion of TPS $D_{OARi}$) and EXP-TPS $D_{PTVmax}$ (obtained through isotropic expansion of TPS $D_{PTVmax}$);
v) Development of the following expanded structure in measured plan: EXP-MSR $D_{PTVmin}$ (obtained through isotropic expansion of MSR $D_{PTVmin}$);
w) Calculation of OR (Overlapping Ratio) factors and VR (Volume Ratio) factors defined as $$OR_{OARi} = \frac{MSR\ D_{OARi} \cap EXP - TPS\ D_{OARi}}{MSR\ D_{OARi}} \quad (1)$$

and $$VR_{OARi} = \frac{TPS\ D_{OARi}}{MSR\ D_{OARi}} \quad (2)$$

for each OAR and for the $D_{PTVmax}$ dose level (i.e. the upper dose limit for PTV); if MSR $D_i$ in (1) and (2) has volume 0 then $OR_{OARi}$ and $VR_{OARi}$ by default equal 1 (likewise, if MSR $D_{PTVmax}$ in (1) and (2) has volume 0 then $OR_{PTVmax}$ and $VR_{PTVmax}$ by default equal 1;
x) Calculation of OR (Overlapping Ratio) factors and VR (Volume Ratio) factors defined as $$OR_{PTVmin} = \frac{TPS\ D_{PTVmin} \cap EXP - MSR\ D_{PTVmin}}{TPS\ D_{PTVmin}} \quad (3)$$

and $$VR_{PTVmin} = \frac{MSR\ D_{PTVmin}}{TPS\ D_{PTVmin}} \quad (4)$$

only for the $D_{PTVmin}$ isodose level (i.e. the lower dose limit for PTV).

* * * * *